(12) United States Patent
Janssen et al.

(10) Patent No.: US 7,565,652 B2
(45) Date of Patent: Jul. 21, 2009

(54) METHOD OF SETTING PRIORITY LEVEL IN A MULTIPROGRAMMING COMPUTER SYSTEM WITH PRIORITY SCHEDULING, MULTIPROGRAMMING COMPUTER SYSTEM AND PROGRAM THEREOF

(75) Inventors: Bob Janssen, Lage Zwaluwe (NL); Peter Gerardus Jansen, Eindhoven (NL)

(73) Assignee: Real Enterprise Solutions Development, B.V., 'S-Hertogenbosch (NL)

( * ) Notice: Subject to any disclaimer, the term of this patent is extended or adjusted under 35 U.S.C. 154(b) by 878 days.

(21) Appl. No.: 10/503,408

(22) PCT Filed: Jan. 30, 2002

(86) PCT No.: PCT/NL02/00070

§ 371 (c)(1),
(2), (4) Date: Feb. 8, 2005

(87) PCT Pub. No.: WO03/065214

PCT Pub. Date: Aug. 7, 2003

(65) Prior Publication Data

US 2006/0037025 A1    Feb. 16, 2006

(51) Int. Cl.
*G06F 9/46* (2006.01)
*G06F 15/173* (2006.01)

(52) U.S. Cl. .................. 718/103; 718/102; 718/104; 718/105; 709/223; 709/226

(58) Field of Classification Search .............. 718/1, 718/100–108; 709/223–226
See application file for complete search history.

(56) References Cited

U.S. PATENT DOCUMENTS

| | | | | |
|---|---|---|---|---|
| 5,838,968 A | * | 11/1998 | Culbert | 718/104 |
| 6,108,683 A | * | 8/2000 | Kamada et al. | 718/103 |
| 6,212,544 B1 | | 4/2001 | Borkenhagen et al. | |
| 6,223,201 B1 | * | 4/2001 | Reznak | 718/102 |
| 6,338,072 B1 | * | 1/2002 | Durand et al. | 707/205 |
| 6,584,488 B1 | * | 6/2003 | Brenner et al. | 718/103 |

(Continued)

FOREIGN PATENT DOCUMENTS

EP    0 880 095    11/1998

(Continued)

OTHER PUBLICATIONS

Kay, "A Fair Share Scheduler", ACM, 1988, vol. 31, No. 1, pp. 44-55.*

(Continued)

*Primary Examiner*—Meng-Ai An
*Assistant Examiner*—Jennifer N To
(74) *Attorney, Agent, or Firm*—Knoble Yoshida & Dunleavy, LLC

(57) ABSTRACT

A method for setting priority levels in a multiprogramming computer system (1) with priority scheduling, in which threads (15, 16, 17) of execution of each process (13, 14) have a standard priority level, comprises measuring relative use of one or more processors (2) in the system (1) by the threads (15, 16, 17) of execution of a process (13, 14). The priority levels of one or more threads (15, 16, 17) of execution are lowered if their measured relative use exceeds a certain escalation threshold for the duration of an escalation time period ($DT_1$).

13 Claims, 2 Drawing Sheets

U.S. PATENT DOCUMENTS

| | | | | |
|---|---|---|---|---|
| 6,601,083 B1 * | 7/2003 | Reznak | ............... | 718/104 |
| 6,859,926 B1 * | 2/2005 | Brenner et al. | ............... | 718/100 |
| 6,895,585 B2 * | 5/2005 | Smith | ............... | 718/103 |
| 6,928,647 B2 * | 8/2005 | Sager | ............... | 718/108 |
| 7,028,298 B1 * | 4/2006 | Foote | ............... | 718/104 |
| 7,383,548 B2 * | 6/2008 | Boon et al. | ............... | 718/102 |
| 2002/0129227 A1 | 9/2002 | Arakawa | | |
| 2002/0143847 A1 * | 10/2002 | Smith | ............... | 709/103 |
| 2003/0187908 A1 * | 10/2003 | Boucher | ............... | 709/103 |
| 2005/0076337 A1 * | 4/2005 | Mangan | ............... | 718/100 |

FOREIGN PATENT DOCUMENTS

| | | |
|---|---|---|
| EP | 0 965 918 | 12/1999 |
| EP | 1 150 208 | 10/2001 |
| GB | 2372349 | 8/2002 |
| WO | WO 99/21081 | 4/1999 |

OTHER PUBLICATIONS

Fong et al Time-Function Scheduling: A General Approach To Controllale Resource Management, T.J. Watson Research Center, Mar. 1995.

* cited by examiner

METHOD OF SETTING PRIORITY LEVEL IN A MULTIPROGRAMMING COMPUTER SYSTEM WITH PRIORITY SCHEDULING, MULTIPROGRAMMING COMPUTER SYSTEM AND PROGRAM THEREOF

BACKGROUND OF THE INVENTION

1 Field of the Invention

The invention relates to a method for setting priority levels in a multiprogramming computer system with priority scheduling, to a multiprogramming computer system with priority scheduling, and to a computer program loadable onto a multiprogramming computer system with priority scheduling.

2 Description of Related Art

A multiprogramming computer system is a computer system that is able to switch back and forth between multiple programs loaded in memory. The operating system of such a computer comprises a scheduler, a part that chooses which of two or more threads of execution that are ready to run should be run next. To ensure that certain threads are more likely to be chosen than others, threads have a priority level assigned to them.

Although common operating systems have mechanisms for changing priority levels, the basic setting of the priority level for processes and/or threads that are created when an application program is run, is not carried out by the operating system. Either the level is set by the provider of an application program, or it is set by a system administrator. This can lead to problems when the execution of a certain program requires a large amount of processor capacity. The high priority setting will lead to a situation where the thread or threads of execution of this program consume all of the available processing resources. This is detrimental to the performance of other processes simultaneously running on the computer system. In situations where different users run application programs on one system, a process started by one of them can cause the other processes to respond very slowly to commands entered by another user.

BRIEF SUMMARY OF THE INVENTION

It is an object of the invention to provide a method, multiprogramming computer system and computer program according to the pre-amble of claims 1, 10 and 11, respectively that can be used to alleviate performance problems caused by a processing-intensive thread of execution.

Accordingly, the invention provides a method for setting priority levels in a multiprogramming computer system with priority scheduling, in which threads of execution of each process have a standard priority level, comprising measuring relative use of one or more processors in the system by the threads of execution of a process, wherein the priority levels of one or more threads of execution are lowered if their measured relative use exceeds a certain escalation threshold for the duration of an escalation time period.

In this manner, a processing-intensive thread will be detected. It will receive a lower priority relative to the other threads of execution. The scheduler in the operating system will therefore allocate fewer time slots to that thread. More time slots will be made available to the other threads of execution.

Preferably, the priority level of all the threads, of execution belonging to one process are lowered if the total relative use by the threads of that process exceed an escalation threshold for the duration of the escalation time period.

Thus, in a computer system able to run multi-threaded code a process with far more threads of execution than others will not evade detection. Users generally only notice if a process is behaving sluggish. Lowering the priority of all threads of execution of a process when the total processing capacity used by them exceeds a threshold will make the other processes more responsive.

Preferably, the priority level of at least one thread is lowered to the lowest level within a range of possible values.

Thus, the effect is instantaneous. It is not necessary to scale back the priority gradually over several time periods. In combination with the use of an escalation time period, the method is stable, yet responsive enough to avoid impatience on the part of users.

Preferably, the lowered priority levels are returned to the standard priority level if the relative use is lower than a probation threshold for the duration of a probation time period.

The method therefore stays effective over an extended time interval, since it is not possible for the priority level of each process to be lowered in turn until all are at the lowest level.

In a preferred embodiment, an incidence of changing a priority level is registered.

It is thus possible to detect 'CPU-hungry' processes. This knowledge can be used to advantage, for example by running such processes at night.

According to an aspect of the invention, a multiprogramming computer system with priority scheduling, capable of or adapted to executing a method according to any one of claims 1-9, is provided.

The computer system, which could also be a multi-user computer system, is responsive to user commands, even when many processes are being run simultaneously.

According to a further aspect of the invention, a computer program loadable onto a multiprogramming computer system with priority scheduling, such that, when run, the computer system is capable of executing a method according to any one of claims 1-9 is provided.

This program can be used to alleviate problems caused by a process claiming too much processing capacity. In particular, it ensures that other processes keep running at a pace acceptable to the users of the computer system.

The invention will now be described in further detail, with reference to the accompanying drawings.

DETAILED DESCRIPTION OF THE INVENTION

Figure 1:
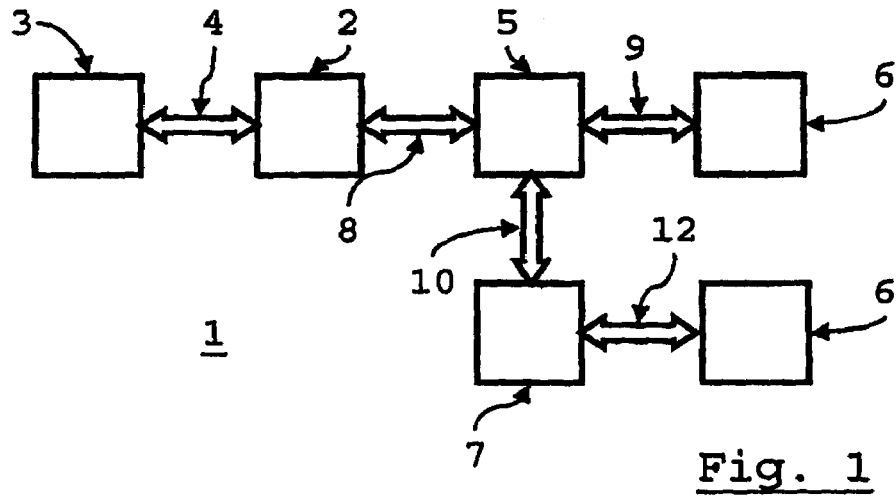
FIG. 1 shows a very schematic diagram of some components of a simple computer system.

FIG. 1 shows a very schematic diagram of some basic components of a computer system, purely to illustrate the purpose of the invention. The system comprises a central processing unit (CPU 2), with a cache 3, connected via a cache bus 4. A bridge chip 5 connects the CPU 2 to system memory 6 and a disk controller 7 via a local bus 8 and a system bus 9 and a main bus 10, respectively. The disk controller provides access to a hard disk 10 over a peripheral device bus 12.

Although the system of FIG. 1 has a single CPU 2, the invention is not limited to single processor computer systems. Indeed, it can not only be used in connection with a multiprocessor computer but also in a distributed computer system that comprises several interconnected nodes, each node comprising a system similar to that of FIG. 1. In such a distributed system, the method according to the invention can be implemented on each node separately, or on the entire system.

The method of the invention is intended for multiprogramming systems. In the following, reference will be made to FIG. 2 to explain some concepts in a multiprogramming system.

One or more programs, algorithms expressed in some suitable notation, are stored on the hard disk 10. When a program is to be run, one or more processes are executed on the computer system. A process in the context of the present application is an activity of some kind. A process has an input, an output and a state. Usually, there is one process for each application program being run, but occasionally the application program starts other processes.

Figure 2:
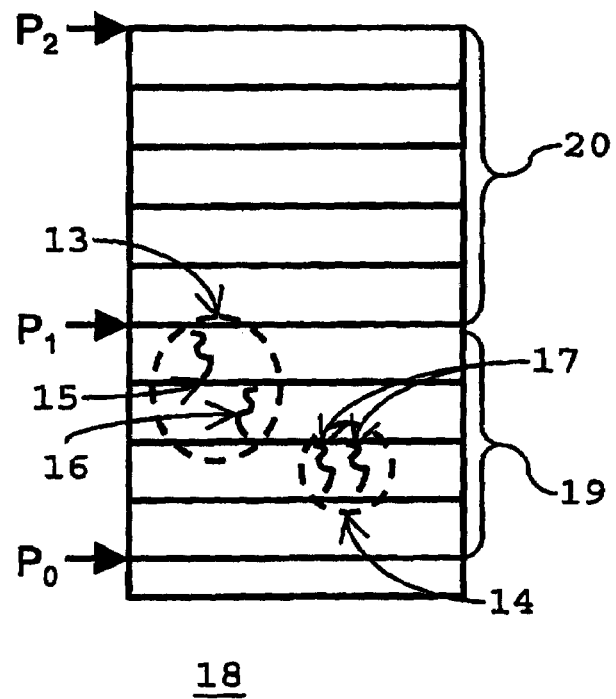
FIG. 2 shows a very schematic diagram of processes and threads at different levels of priority.

In FIG. 2 a first process 13 and a second process 14 are schematically depicted. Each process 13, 14 has some address space in the system memory 6 allocated to it, a list of memory locations a process can read and write. When one of the processes 13, 14 is to be executed, the contents of the address space are loaded into the CPU's register, and the instructions, also stored in the address space of each process, are carried out.

The system of FIG. 1 is a multiprogramming system, meaning that the first and second processes 13, 14 can be in system memory 6 concurrently. The system switches back and forth between the processes 13, 14 in such a way that it appears to the user that the processes 13, 14 are running simultaneously. If both processes 13, 14 are ready to run, a scheduling algorithm in the operating system is used to decide which one should be run.

In a multithreaded system, each process can have one or more threads of execution. In the example of FIG. 2, the first process 13 in FIG. 2 has a first thread 15 and a second thread 16. The second process 14 also has two threads 17. A thread of execution is an entity scheduled for execution on the CPU 2. Each of the threads 15, 16, 17 has a program counter, indicating its progress, registers holding its current working variables, and a stack. The threads 15, 16 of execution of the first process 13 share the address space of that process 13, open files and other resources. The same holds true for the threads 17 of the second process 14.

In a multiprogramming system that supports multi-threading, the system switches back and forth between the threads 15-17 of execution. Again, the scheduling algorithm decides which of the threads 15-17 should be run, when more than one is ready. The invention will be explained in the context of a multiprogramming system that supports multi-threading. The skilled person will, however, understand that in a system that does not support multi-threading, each process will have exactly one thread of execution. In such a system the invention can still be applied. The terms thread and process can then be used interchangeably.

Most modern operating systems use a form of priority scheduling algorithm. Several variants exist, and the invention is not limited to use with any one particular variant. However, the invention will be explained in the context of a variant deployed in one widely used operating system, which also supports multithreading. Referring to FIG. 2, an array 18 of priority levels is shown. Each of the threads 15-17 of execution is at a priority level within a range of available user priority levels. In the example, $P_0$ denotes the lowest available level, $P_1$ the highest. The array 18 also comprises a range of system priority levels 20 in a range from $P_1$ to $P_2$. The system priority levels are re-served for threads of operating system processes.

In the operating system used here to explain the invention, there are several process priority classes and several thread priority classes. Each of the threads 15-17 has a basic priority level, determined by both the thread priority class assigned to it and the process priority class assigned to the process of which it is part. Thus, the first thread 15 of the first process 13 is in a higher thread priority class than a second thread 16. The first thread 15 is therefore at a higher user priority level 13 than the second thread 16.

Processing time on the CPU 2 is divided into quanta, typically between 20 and 200 ms. The scheduler takes action whenever one of three events occurs: a time quantum has ended, a thread blocks (i.e. it cannot continue to run because it needs input that is not immediately available), or an interrupt occurs. At that point, the scheduler will select the thread at the highest of the priority levels first. Where several threads are at one priority level, a waiting queue is used, so that each of the threads at that level is selected in turn.

The basic priority of a thread is not changed by the operating system. It starts at a standard level; a level set by the program or by the system administrator which is normally maintained throughout the running of the thread.

The operating system can add a value to the basic priority level. In the example operating system, the priority level of a thread can be temporarily boosted by adding a factor to the basic priority level. Other operating systems add a time-varying amount to the basic priority, such that the total priority level decreases when the thread is executed and increases when not.

It has been found that neither temporary boosting nor the addition of a time-varying factor to the basic priority level adequately avoids problems caused by threads or processes with too high a basic priority level. Such a thread is continually selected for running, more often than not using up the entire time quantum. In the operating system used here as an example, a low user priority level is only boosted for the duration of one or two time quanta. This is enough for a command to be entered to such a process, but not enough for the process to do much with the command. The moment the temporary boost has ended, the thread with the higher basic priority level will take over again. On a macroscopic time scale several orders of magnitude larger than that of the time quanta, the CPU will predominantly be running the threads with the higher basic priority level.

Severe problems can be the result, especially in computer systems comprising networked high-end servers and workstations used by several users. If, for example, one user is running an image processing application with a high basic priority level, other users will notice their applications becoming slower and less responsive. Typically, one user will complain to a system administrator, who will set back the basic priority of the threads of the image processing application by hand.

The invention provides a program that is able to automatically adjust basic priority levels, such that such adjustments by a system administrator are no longer necessary. The relative use of the CPU 2 by the threads 15, 16, 17 of execution are measured. The basic priority level of a thread of execution is lowered from its standard level if the relative use exceeds a certain escalation threshold during an escalation time period of a certain length. As mentioned above, the standard level is the default level at which the thread is normally run.

Thus, in the example system, the relative use of the processor by the threads 15, 16 of execution of the first process 13 is measured, as is the relative use by the threads 17 of execution of the second process 14. In a system supporting multithreading, looking at each of the threads of execution individually is not advisable from a user's point of view. An image processing application with many threads of execution might escape notice, since each individual thread will not use up a large share of processing time. Taken together, however, the threads of one process might totally prevent the threads of other processes from being run.

Therefore, in a system supporting multithreading, the priority levels of all the threads of execution belonging to one process are lowered if the total relative use by the threads of that process exceeds a certain escalation threshold during a certain period of time.

In the example system, this can be achieved easily by lowering the process priority class, for example through a system call to the operating system.

Figure 3:
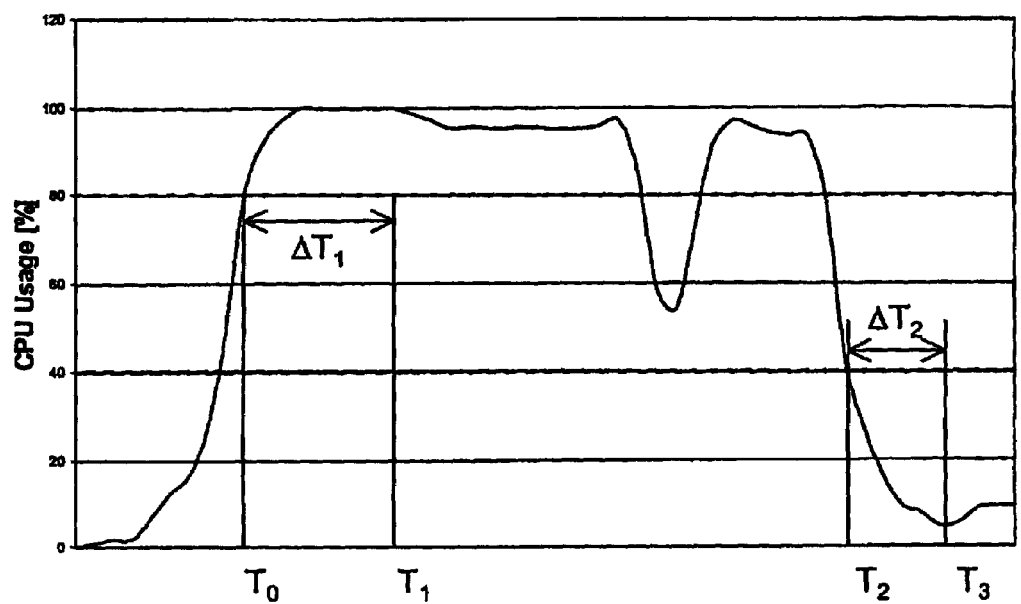
FIG. 3 shows a graph of the relative amount of CPU-processing power used by a process.

Referring to FIG. 3, the relative use of the CPU 2 by the first process 13 is shown. The graph is derived from a system using the method according to the invention. The relative usage is expressed as a percentage of processing time, but some other measure like the number of operations could in principle be used. The escalation threshold has been set at 80% in this example. At a point $T_0$ in time, the relative use of the processor by the first process 13 exceeds the escalation threshold. In fact it is substantially at 100%. Because the relative use stays above 80% throughout a time interval $\Delta T_1$, the first process 13 is moved to a lower process priority class. The priority level of both the threads 15, 16 of the process 13, including the 'CPU-hungry' thread is consequently also lowered. As a result the relative use drops to around 95%, which is enough to allow the second process to proceed without much hindrance.

The length of the time interval $\Delta T_1$ depends largely on the amount of tolerance of the users of the computer system. As is obvious from the graph of FIG. 3, it is possible that the other processes are effectively barred from running during the time interval $\Delta T_1$. Of course, if after lowering the priority level of the first process 13, the priority level of the 'CPU-hungry' thread is still higher than that, of all the threads of the second process 14, nothing will happen until another time interval of length $\Delta T_1$ has elapsed. This would be unacceptable.

Accordingly, the priority level is lowered to the lowest level within a range of allowed values at $T_1$. In the example system, the process priority class is lowered to the lowest possible level. Within the scope of the invention, however, the thread priority class of all the threads of the process could additionally be lowered to the lowest possible level. Both the threads 15, 16 of the first process 13 would then be at level $P_0$.

Often, a process or thread only temporarily consumes too much processor capacity. An example situation is one wherein two users are running a word processing application on one machine. Each of the two processes is at the same basic priority level. One user might decide to run a macro. At that point, his process might use up so much processor capacity that the other process is effected. The priority level of the process running a macro will then be lowered. If at a later point the other user runs a macro, the priority of his process will be lowered. Both processes will now be at the lowest priority level. No further remedies are left if one process again starts to dominate.

This undesirable situation is avoided, because the lowered priority levels are returned to the standard priority level if the relative use is lower than a probation threshold. In FIG. 3, the probation threshold is set at 40%.

Of course, the CPU usage could temporarily dip below the probation threshold. If the priority levels were to be returned to the standard priority level immediately, then a very unstable system would be the result, in which basic priority levels were being changed almost every second.

This is avoided by only returning the priority levels to the standard priority level if the relative use is lower than the probation threshold during a probation time period of a certain length $\Delta T_2$. Thus, in FIG. 3, the priority level of the threads 15, 16 of the first process 13 are returned to their standard levels at $T_3$.

The method according to the invention co-exists with the scheduling algorithm of the operating system. It is provided as a separate program running in user space. The scheduler of the operating system runs in kernel space, using the basic priorities determined set by the program of the invention.

The operating system scheduler and the method of the invention serve different but complimentary purposes. The scheduler primarily ensures that efficient use is made of the resources of the computer system resources, for example that it is responsive to keyboard commands and other forms of input and output. Scheduler parameters are therefore platform dependent.

The method of the invention ensures provides a better user experience. Parameters are therefore based on user preferences, such as how long a person is prepared to wait for a process to resume. It is therefore advantageous to run the method in user space so that the program can be run on different systems with different operating systems or be ported to operating systems.

Although the operating system scheduler and the program of the invention both adjust thread priority levels, they do so on a different time scale. The operating system scheduler works on a time scale determined by the time quanta, typically 10-100 ms. The program of the invention operates on the time scale set by the escalation time period length $\Delta T_1$. The length of the escalation time period is higher than 1s. More usually, it is even higher, for example 2 s or 5 s. The program of the invention will therefore not interfere with the scheduling algorithm in such a way that the computer system becomes unstable.

The program of the invention is intended as a solution to the problems commonly faced by system administrators. It relieves them of the burden of having to adjust the basic priority levels of threads or processes manually. It also provides two additional features.

Firstly, an incidence of changing a priority level is registered. An entry is made in a log at $T_1$ and at $T_3$. The entry identifies at least the culpable process. A system administrator uses the log to decide to lower the standard priority level of a process or to have the process run at a more convenient time, for example at night. Because an entry is made both when the priority level is lowered and when it is raised, it is possible to determine how long a process makes excessive demands on the processing power of the CPU 2.

As a second feature the system administrator is able to adjust at least one of the thresholds and/or time period lengths $\Delta T_1, \Delta T_2$, but preferably all of them. He can thus fine-tune the performance of the system at all times.

Changes to the escalation threshold can be made to take account of the number of processes running. 95% might be quite acceptable where only two processes are running, because the remaining 5% will be quite adequate. If several hundred processes are running, 5% might be far too little for all of them to run at an acceptable pace. Changes to the probation threshold might similarly be used to take account of the number of processes running.

A small increase to the escalation time period $\Delta T_1$ might, for example, be useful when a process is characterised by several large CPU bursts each of a duration that is slightly longer than the normal escalation time period $\Delta T_1$. The increase in $\Delta T_1$ would prevent frequent changes in the basic priority level.

It will be apparent to those skilled in the art that the invention is not limited to the embodiment described above, but can be varied within the scope of the claims. In this respect, it is noted that some operating systems make use of negative priority levels. Processes or threads at a priority level with a lower (i.e. more negative) value take precedence over those with a higher value. In the present application, a higher priority level should be read as a priority level that will enable a process or thread at that level to take precedence over processes at a lower level.

The invention claimed is:

1. Method for setting priority levels in a multiprogramming computer system with priority scheduling, in which each of one or more threads of execution of a process has an associated basic priority level, comprising:
measuring total relative use of one or more processors in the computer system by the one or more threads;
lowering at least one basic priority level of the one or more threads when the measured total relative use exceeds an escalation threshold for a duration of an escalation time period; and
returning the at least one lowered priority level of the one or more threads to the basic priority level when the measured total relative use is lower than a probation threshold for a duration of a probation time period,
wherein:
the escalation time period is a first time period over which the total relative use of the one or more processors is measured,
the probation time period is a second time period over which the total relative use of the one or more processors is measured, and
wherein the escalation threshold is greater than the probation threshold.

2. Method according to claim 1, further comprising lowering the basic priority levels of all of the one or more threads when the measured total relative use of the one or more processors in the computer system by the one or more threads exceeds the escalation threshold for the duration of the escalation period.

3. Method according to claim 2, wherein the at least one basic priority level of the one or more threads is lowered to the lowest possible level.

4. Method according to claim 3, wherein the priority levels are changed by a program running in user space, and the priorities are used by an operating system scheduler.

5. Method according to claim 2, wherein the priority levels are changed by a program running in user space, and the priorities are used by an operating system scheduler.

6. Method according to claim 1, wherein the at least one basic priority level of the one or more threads is lowered to the lowest possible level.

7. Method according to claim 6, wherein the priority levels are changed by a program running in user space, and the priorities are used by an operating system scheduler.

8. Method according to claim 1, wherein the priority levels are changed by a program running in user space, and the priorities are used by an operating system scheduler.

9. Method according to claim 1, wherein an incidence of changing a priority level is registered.

10. Method according to claim 1, wherein the escalation time period is longer than one second.

11. Method according to claim 1, wherein at least one of the escalation threshold, the probation threshold, the escalation time period, and/or the probation time period is adjusted in value by an administrator of the computer system.

12. A multiprogramming computer system with priority scheduling, in which each of one or more threads of execution of a process has an associated basic priority level, comprising:
a system memory; and
one or more central processing units (CPUs) connected to the system memory and configured to:
measure total relative use of the one or more CPUs by the one or more threads,
lower at least one basic priority level of the one or more threads when the measured total relative use exceeds an escalation threshold for a duration of an escalation time period, and
return the at least one lowered priority level of the one or more threads to the basic priority level when the measured total relative use is lower than a probation threshold for a duration of a probation time period,
wherein:
the escalation time period is a first time period over which the total relative use of the one or more processors is measured,
the probation time period is a second time period over which the total relative use of the one or more processors is measured, and
wherein the escalation threshold is greater than the probation threshold.

13. A computer program stored in memory of a multiprogramming computer system with priority scheduling in which each of one or more threads of execution of a process has an associated basic priority level, such that, when the computer program runs, the computer system performs the steps of:
measuring total relative use of one or more processors in the computer system by the one or more threads;
lowering at least one basic priority level of the one or more threads when the measured total relative use exceeds an escalation threshold for a duration of an escalation time period; and
returning the at least one lowered priority level of the one or more threads to the basic priority level when the measured total relative use is lower than a probation threshold for a duration of a probation time period,
wherein:
the escalation time period is a first time period over which the total relative use of the one or more processors is measured,
the probation time period is a second time period over which the total relative use of the one or more processors is measured, and
wherein the escalation threshold is greater than the probation threshold.

* * * * *